US011075017B2

(12) United States Patent
Ko et al.

(10) Patent No.: US 11,075,017 B2
(45) Date of Patent: Jul. 27, 2021

(54) MODULAR LOWER MOVING SYSTEM FOR NUCLEAR FUEL HANDLING

(71) Applicant: KEPCO ENGINEERING & CONSTRUCTION COMPANY, INC., Gyeongsangbuk-do (KR)

(72) Inventors: Kwang Jeok Ko, Daejeon (KR); Ho Jung Lee, Daejeon (KR); Min Gyu Kim, Daejeon (KR); Yeon Ho Cho, Daejeon (KR); Hyun Min Kim, Daejeon (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 637 days.

(21) Appl. No.: 15/904,616

(22) Filed: Feb. 26, 2018

(65) Prior Publication Data

US 2019/0043626 A1 Feb. 7, 2019

(30) Foreign Application Priority Data

Aug. 3, 2017 (KR) ........................ 10-2017-0098522

(51) Int. Cl.
*G21C 19/18* (2006.01)
*G21C 19/10* (2006.01)
(Continued)

(52) U.S. Cl.
CPC ............. *G21C 19/10* (2013.01); *G21C 1/028* (2013.01); *G21C 19/18* (2013.01); *G21C 19/19* (2013.01); *G21C 19/32* (2013.01)

(58) Field of Classification Search
CPC ........ G21C 19/18; G21C 19/19; G21C 19/20; G21C 19/32; G21C 13/00; G21C 13/02; G21F 5/14; E04G 21/00
(Continued)

(56) References Cited

U.S. PATENT DOCUMENTS 3,755,079 A 8/1973 Weinstein et al.
4,053,067 A * 10/1977 Katz ...................... G21C 19/18
376/268

(Continued)

FOREIGN PATENT DOCUMENTS

CN 104464857 A * 3/2015 ............. G21C 19/19
EP 0 806 778 11/1997
(Continued)

OTHER PUBLICATIONS

Extended European Search Report dated Jun. 26, 2018 of European Patent Application No. 18158947.4.
(Continued)

*Primary Examiner* — Jack W Keith
*Assistant Examiner* — Jinney Kil
(74) *Attorney, Agent, or Firm* — Nixon Peabody LLP; Jeffrey L. Costellia

(57) ABSTRACT

The modular lower moving system for nuclear fuel handling includes: a lower reactor vessel assembly including nuclear fuel loaded therein; a carrier having a space allowing the lower reactor vessel assembly to be accommodated therein; a rail extending from a reactor area to a fuel handling area; a transfer cart horizontally movable along the rail; a lifting device installed at the transfer cart, movable upward or downward with respect to the transfer cart; and a drive device configured to supply power to the transfer cart and the lifting device. The method of refueling nuclear fuel using the modular lower moving system includes a carrier lifting process, a lower reactor vessel assembly detachment process, a process of accommodating the lower reactor vessel assembly in the carrier, a carrier lowering process, a transfer cart movement process, a nuclear fuel offloading process, and a nuclear fuel loading process.

7 Claims, 7 Drawing Sheets

(51) Int. Cl.
*G21C 1/02* (2006.01)
*G21C 19/19* (2006.01)
*G21C 19/32* (2006.01)

(58) Field of Classification Search
USPC .......................................................... 414/146
See application file for complete search history.

(56) References Cited

U.S. PATENT DOCUMENTS

| | | | | |
|---|---|---|---|---|
| 4,714,228 | A | * 12/1987 | Blaushild | G21F 5/14 |
| | | | | 248/608 |
| 5,864,594 | A | * 1/1999 | Balog | G21C 19/00 |
| | | | | 376/260 |
| 2004/0247012 | A1 | * 12/2004 | Schubert | C21C 5/5211 |
| | | | | 373/71 |
| 2010/0098205 | A1 | * 4/2010 | Kang | G21C 13/02 |
| | | | | 376/263 |
| 2013/0301776 | A1 | 11/2013 | Shargots et al. | |
| 2017/0213608 | A1 | * 7/2017 | Keller | G21C 19/32 |

FOREIGN PATENT DOCUMENTS

| | | | | |
|---|---|---|---|---|
| GB | 1000777 A | * | 8/1965 | ............. G21C 19/18 |
| JP | 07218685 A | * | 8/1995 | |
| JP | 10-054896 | | 2/1998 | |
| JP | 3861143 | | 12/2006 | |
| JP | 3861143 B2 | * | 12/2006 | ............. G21C 17/10 |
| KR | 10-0248187 | | 3/2000 | |
| WO | WO-2006085560 A1 | * | 8/2006 | ............. G21C 19/19 |
| WO | WO-2010064740 A1 | * | 6/2010 | ............. G21C 17/10 |
| WO | WO-2012/039940 | | 3/2012 | |

OTHER PUBLICATIONS

Korean Office Action for Application No. 10-2017-0098522, dated Mar. 11, 2019.

* cited by examiner

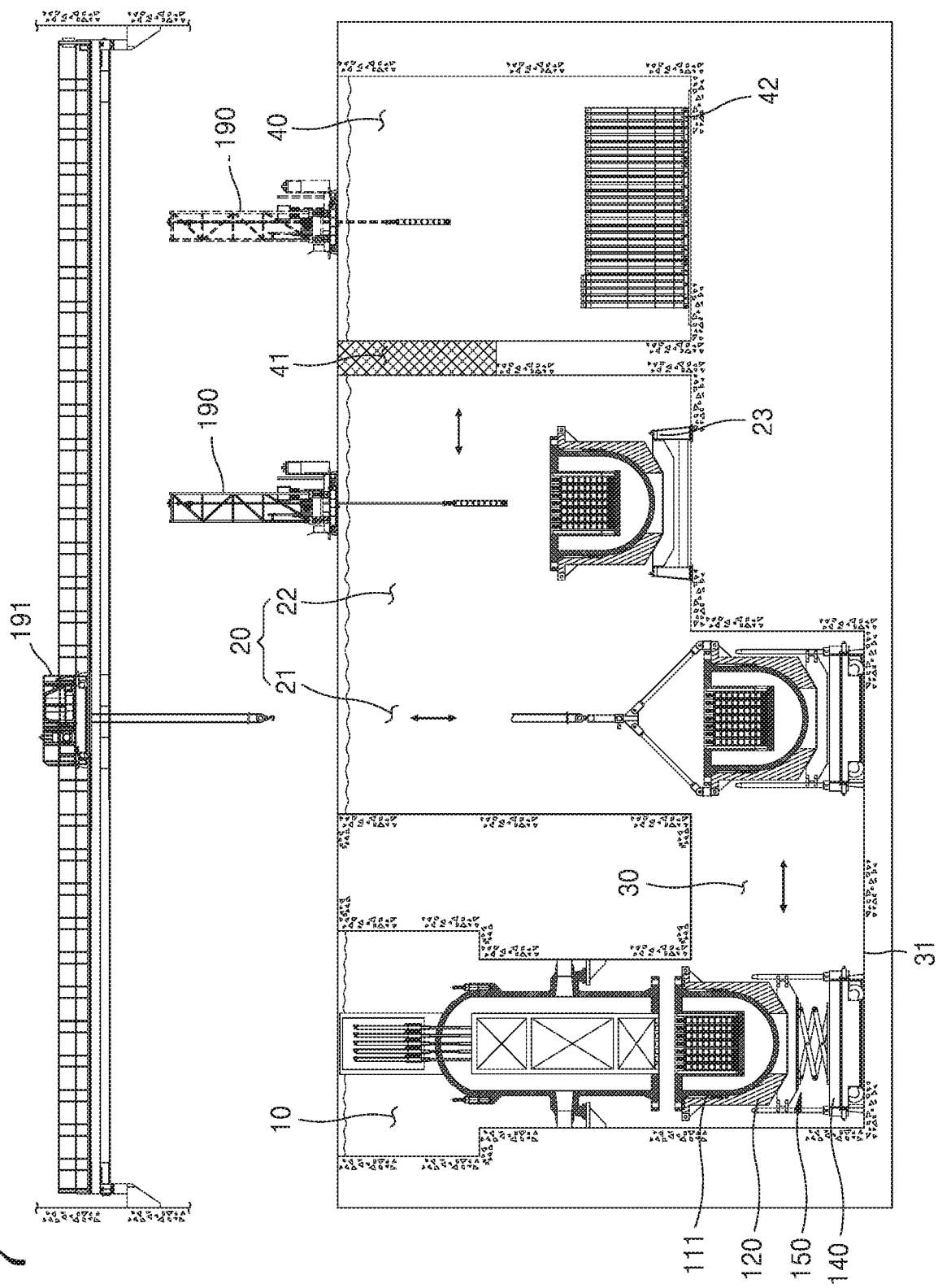

ive benefit of Korean Patent
MODULAR LOWER MOVING SYSTEM FOR NUCLEAR FUEL HANDLING

CROSS-REFERENCE TO RELATED APPLICATION

This application claims the benefit of Korean Patent Application No. 10-2017-0098522, filed on Aug. 3, 2017, in the Korean Intellectual Property Office, the disclosure of which is incorporated herein in its entirety by reference.

BACKGROUND

1. Field

One or more embodiments relate to a modular lower moving system for nuclear fuel handling and a method of refueling nuclear fuel using the same, and more particularly, to a modular lower moving system for nuclear fuel handling which is capable of detaching a lower reactor vessel assembly, in which nuclear fuel is loaded, from a lower portion of a reactor vessel and moving nuclear fuel from the lower portion of the reactor vessel using a lifting device and a transfer cart, and a method of refueling nuclear fuel using the same.

2. Description of the Related Art

In existing pressurized water reactor-type nuclear power plants, to replace spent fuel, a reactor operation should be stopped, a reactor head area structure assembly should be removed along with a reactor vessel closure head, and an upper guide structure inside the reactor should be removed. However, these processes require complicated procedures and operations as a main process for removing related components.

First, a spent fuel replacement process is performed by stopping a reactor operation, detaching a control rod drive device from an extension shaft thereof, and separating related cables. A reactor vessel closure head stud is removed and then a guide pin is installed in a vessel stud hole, a space between a reactor vessel seal ledge and an embedment ring in the refueling pool floor is sealed by a reactor cavity pool seal assembly, sealing media and all in-core instruments inserted into a reactor core are taken out.

Next, a refueling pool is filled with refueling water, an upper guide structure lifting device is installed in an upper guide structure and fastened therewith, and then the resulting structure is removed from a reactor vessel and stored on an upper guide structure laydown area, thereby forming an environment allowing nuclear fuel to be unloaded from the reactor.

Subsequently, the spent fuel is grappled with a refueling machine in the reactor, which is then moved a refueling canal, and the spent fuel is transferred to a fuel building via a nuclear fuel transfer system located at the refueling canal. A spent fuel handling machine located in the fuel building withdrawns the spent fuel carried via a fuel transfer system and transfers the spent fuel to a spent fuel storage rack in the spent fuel pool.

Nuclear fuel reloading process is then reversed in opposite order to spent fuel offloading procedures. When refueling is completed, the upper guide structure is inserted again into the reactor vessel, control rod assemblies and control rod assembly extension shafts also return to their original positions, the in-core instruments are inserted again into the core, and the cables are connected to each other, thereby completing the refueling of nuclear fuel.

As described above, the reactor vessel closure head shall be removed from a reactor head area structure assembly to replace spent fuel and an upper guide structure inside a reactor vessel should be removed. However, a plurality of complicated structures are located at an upper portion of a reactor vessel, and complicated procedures and operations for removing these structures are required and various equipment therefore is required.

SUMMARY

One or more embodiments include a modular lower moving system for nuclear fuel handling which is capable of detaching a lower reactor vessel assembly, in which nuclear fuel is loaded, from a lower portion of a reactor vessel and moving nuclear fuel from the lower portion of the reactor vessel using a lifting device and a transfer cart, and a method of refueling nuclear fuel using the same.

Additional aspects will be set forth in part in the description which follows and, in part, will be apparent from the description, or may be learned by practice of the presented embodiments.

According to one or more embodiments, a modular lower moving system for nuclear fuel handling includes a lower reactor vessel assembly installed below a reactor vessel located in the reactor area, detachable from the reactor vessel, and including nuclear fuel loaded therein; a carrier having a space allowing the lower reactor vessel assembly detached from the reactor vessel to be accommodated therein; a rail installed at a bottom of the transfer canal and extended from the reactor area to the fuel handling area; a transfer cart horizontally movable along the rail; a lifting device installed at the transfer cart, horizontally movable along the rail along with the transfer cart, and movable upward or downward with respect to the transfer cart; and a drive device configured to supply power to the transfer cart and the lifting device, wherein the carrier is assembled on the lifting device to be lifted or lowered via the lifting device, the lower reactor vessel assembly detached from the reactor vessel is accommodated in the carrier, and the carrier is horizontally movable along the rail via the transfer cart.

The drive device may include a drive unit installed in the fuel handling area and configured to provide power; a first extension stem connected to the drive unit and extending downward of the drive unit; a first gear shaft connected to the first extension stem and connected to the transfer cart; a second extension stem connected to the drive unit and extending downward of the drive unit; and a second gear shaft connected to the second extension stem and connected to the lifting device, wherein power of the drive unit may be transmitted to the transfer cart via the first extension stem and the first gear shaft, and may be transmitted to the lifting device via the second extension stem and the second gear shaft. The first gear shaft may be connected to the transfer cart via a gear to convert rotational movement of the first gear shaft into horizontal movement of the transfer cart, and the second gear shaft may be connected to the lifting device via a gear to convert rotational movement of the second gear shaft into vertical movement of the lifting device.

The carrier may be provided, at an inner wall thereof, with insertion keys protruding inward of the carrier, the lower reactor vessel assembly may be provided, at an outer wall thereof, with keyways protruding outside the lower reactor vessel assembly and each having a groove allowing the insertion key to be inserted thereinto, the insertion keys may be installed along the inner wall of the carrier with constant intervals of 90° therebetween, and the keyways may be installed along the outer wall of the lower reactor vessel assembly with constant intervals of 90° there between.

A fixed guide pin may be installed at a side surface of the reactor area and another side surface of the fuel handling area, the fixed guide pin extending upward from a bottom surface and having a rod shape, and a rotary guide pin may be arranged, the rotary guide pin extending upward from the bottom surface, spaced apart from the fixed guide pin by a constant distance, and having a rod shape, wherein the rotary guide pin may be rotatable about a first virtual axis extending in a direction parallel to a direction in which the rotary guide pin extends upward. The drive device may include a drive unit installed in the fuel handling area and configured to provide power; a first extension stem connected to the drive unit and extending downward of the drive unit; a first gear shaft connected to the first extension stem and connected to the transfer cart; and a rotary gear connected to a side surface of the first gear shaft, wherein a center of the rotary gear may be positioned on the first virtual axis, and the rotary guide pin may be eccentrically installed at the rotary gear, allowing the rotary guide pin to be rotatable via the rotary gear.

The modular lower moving system may further include a hole plug installed at least one of the carrier, the lifting device, and the transfer cart, and having a groove shape allowing the fixed guide pin or the rotary guide pin to be inserted thereinto.

According to one or more embodiments, a method of refueling nuclear fuel using a modular lower moving system for nuclear fuel handling, including: a lower reactor vessel assembly installed below a reactor vessel located in a reactor area, detachable from the reactor vessel, and including nuclear fuel loaded therein; a carrier having a space allowing the lower reactor vessel assembly detached from the reactor vessel to be accommodated therein; a rail installed at a bottom of a transfer canal and extending from the reactor area to a fuel handling area; a transfer cart horizontally movable along the rail; a lifting device installed at the transfer cart, horizontally movable along the rail along with the transfer cart, and movable upward or downward with respect to the transfer cart; and a drive device configured to supply power to the transfer cart and the lifting device, wherein the carrier is assembled on the lifting device to be lifted or lowered via the lifting device, the lower reactor vessel assembly detached from the reactor vessel is accommodated in the carrier, and the carrier is horizontally movable along the rail via the transfer cart, includes: lifting the carrier in the reactor area via the lifting device; detaching the lower reactor vessel assembly installed below the reactor vessel; accommodating the detached lower reactor vessel assembly in the carrier; lowering the carrier via the lifting device; horizontally moving the transfer cart from the reactor area to the fuel handling area; and offloading nuclear fuel loaded in the lower reactor vessel assembly by lifting the carrier via the lifting device.

The offloading may include grappling the nuclear fuel to a handling tool installed at a spent fuel handling machine by lifting the lifting device of the transfer cart transferred to the fuel handling area; and transporting the nuclear fuel to a spent fuel storage tank via the spent fuel handling machine.

The method may further include refueling nuclear fuel loaded in the lower reactor vessel assembly; lowering the carrier via the lifting device; horizontally moving the transfer cart from the fuel handling area to the reactor area; lifting the carrier via the lifting device; and coupling the lower reactor vessel assembly to a lower portion of the reactor vessel.

BRIEF DESCRIPTION OF THE DRAWINGS

These and/or other aspects will become apparent and more readily appreciated from the following description of the embodiments, taken in conjunction with the accompanying drawings in which:

FIG. 7 is a view illustrating nuclear fuel replacement using a modular lower moving system for nuclear fuel handling according to another embodiment.

DETAILED DESCRIPTION

Figure 1:
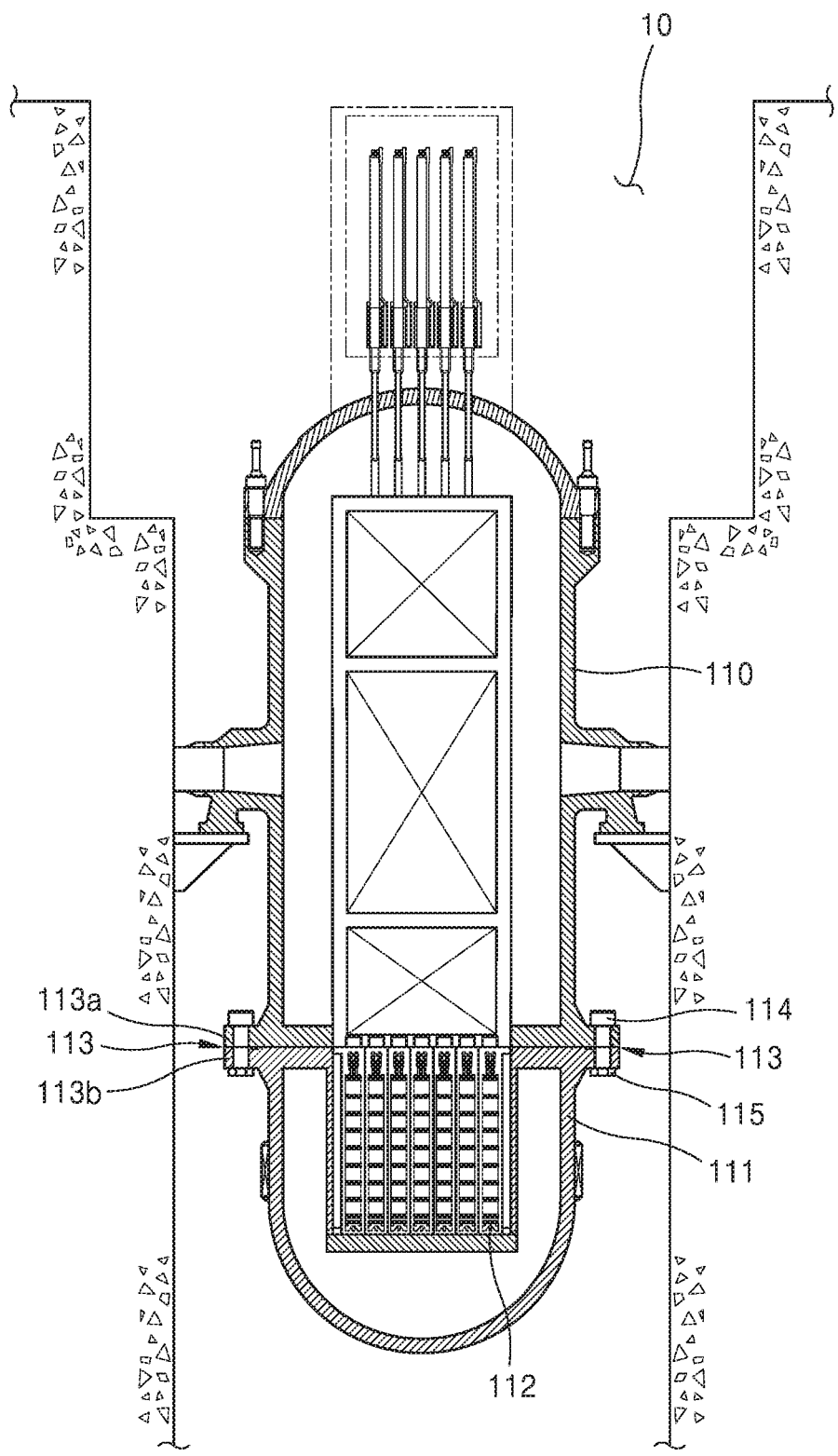
FIG. 1 is a view illustrating a lower reactor vessel assembly installed below a reactor vessel and detachable from the reactor vessel, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list.

One or more embodiments relate to a modular lower moving system for nuclear fuel handling which is capable of detaching a lower reactor vessel assembly, in which nuclear fuel is loaded, from a lower portion of a reactor vessel and moving nuclear fuel from the lower portion of the reactor vessel using a lifting device and a transfer cart, and a method of refueling nuclear fuel using the same. Hereinafter, exemplary embodiments of the present disclosure will be described in detail with reference to the accompanying drawings.

The modular lower moving system for nuclear fuel handling is configured to transfer nuclear fuel via a transfer canal 30 installed between a reactor area 10 in which a reactor vessel is installed and a fuel handling area 20, and includes a lower reactor vessel assembly 111, a carrier 120, a rail 130, a transfer cart 140, a lifting device 150, and a drive device 160.

Referring to FIG. 1, the lower reactor vessel assembly 111 is installed below a reactor vessel 110 located in the reactor area 10, and has nuclear fuel 112 loaded below the reactor vessel 110.

The lower reactor vessel assembly 111 is detachably coupled to the reactor vessel 110. In particular, the lower reactor vessel assembly 111 is detachably coupled to the reactor vessel 110 via a flange 113, bolts 114, and nuts 115.

The flange 113 includes an upper flange 113a installed at the reactor vessel 110 and a lower flange 113b installed at the lower reactor vessel assembly 111. Through-holes are formed in the upper and lower flanges 113a and 113b, the bolts 114 are inserted into the respective through-holes, and the nut 115 is fastened with each bolt 114 so that the lower reactor vessel assembly 111 is coupled to the reactor vessel 110.

A sealing media may be inserted between the upper flange 113a and the lower flange 113b to maintain an intrinsic sealing function of a reactor, and the sealing media may be inserted into a groove formed at an upper surface of the lower flange 113b to seal the reactor. The nuts 115 are installed at a bottom surface of the lower flange 113b, and thus enable application of tensile force required when the upper flange 113a is bolt-fastened with the lower flange 113b, and may enhance workability in a narrow space.

To offload or reload the nuclear fuel 112, first, the lower reactor vessel assembly 111 is detached from the reactor vessel 110. At this time, the bolts 114 may be remotely removed considering operating conditions of the reactor area 10, thereby detaching the lower reactor vessel assembly 111 from the reactor vessel 110.

Figure 2:
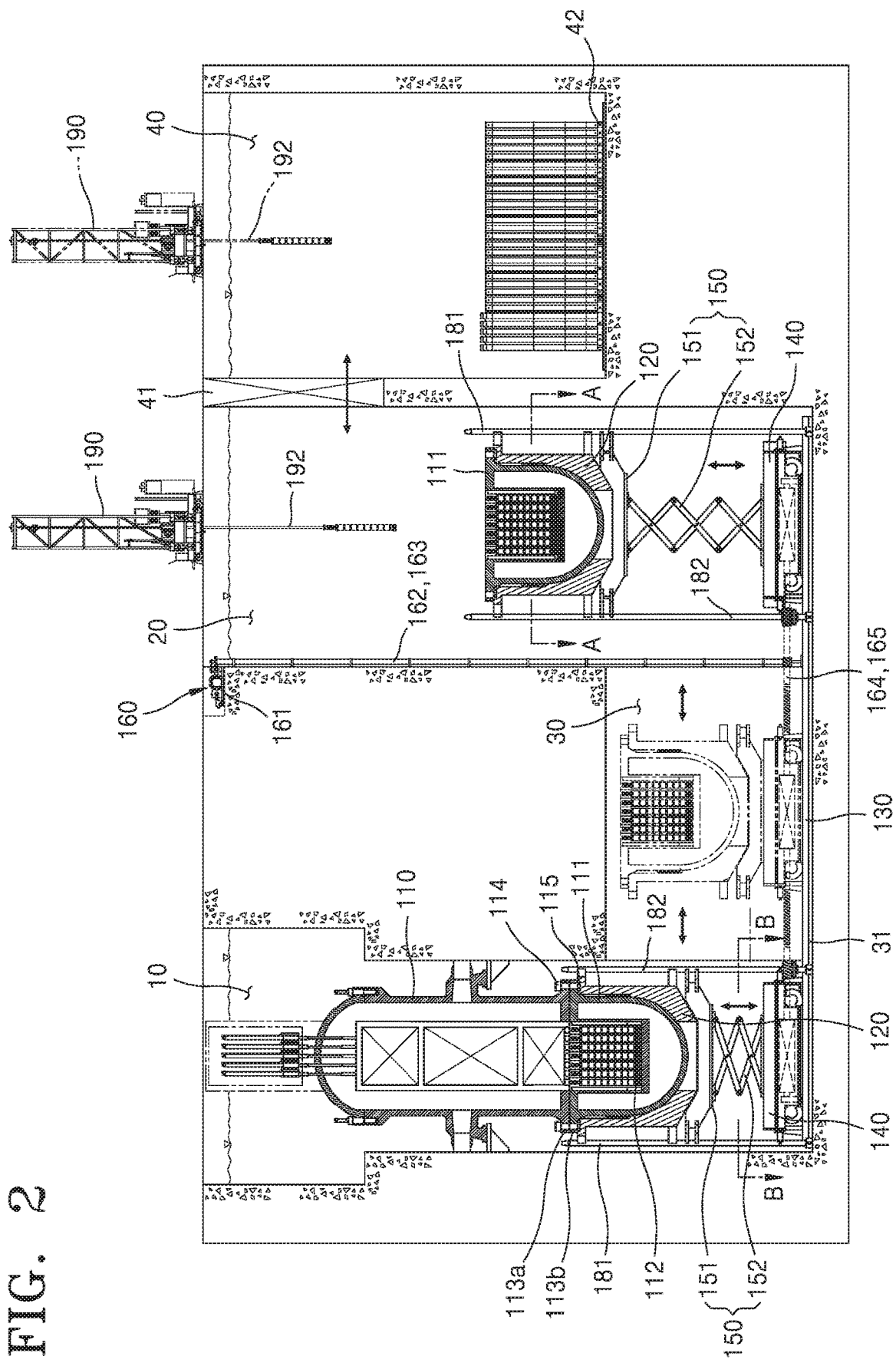
FIG. 2 is a view illustrating nuclear fuel replacement using a modular lower moving system for nuclear fuel handling according to an embodiment.

Referring to FIG. 2, the carrier 120 has a space capable of accommodating the lower reactor vessel assembly 111 detached from the reactor vessel 110. The carrier 120 acts as a support for accommodating the lower reactor vessel assembly 111, and the space of the carrier 120 has a shape corresponding to an external shape of the lower reactor vessel assembly 111. The carrier 120 may have various shapes as long as the carrier 120 can accommodate and carry the lower reactor vessel assembly 111.

Figure 3:
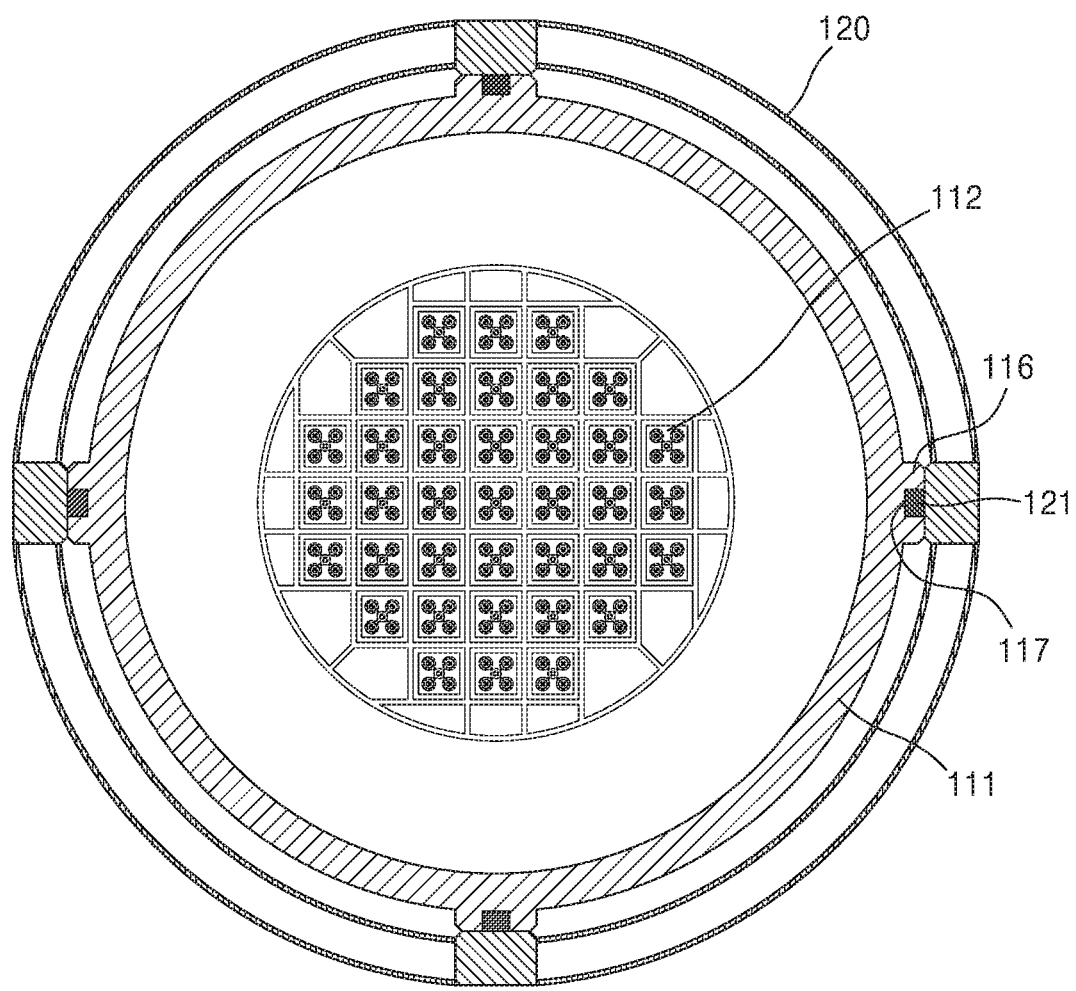
FIG. 3 is a cross-sectional view taken along line A-A of FIG. 2.

Referring to FIG. 3, when the lower reactor vessel assembly 111 is accommodated in the carrier 120, keyways 116 may be installed at an outer wall of the lower reactor vessel assembly 111 to facilitate alignment of the lower reactor vessel assembly 111, and insertion keys 121 may be installed at an inner wall of the carrier 120.

In particular, the keyways 116 protrude from the outer wall of the lower reactor vessel assembly 111, and each keyway 116 has a groove 117 allowing the insertion key 121 to be inserted thereinto. The insertion keys 121 protrude from the inner wall of the carrier 120 into the carrier 120 and may be inserted into the respective grooves 117.

As the insertion keys 121 are inserted into the grooves 117 of the keyways 116, the lower reactor vessel assembly 111 may be accommodated in the carrier 120 without being shaken, and the lower reactor vessel assembly 111 may be easily aligned in its insertion direction when the lower reactor vessel assembly 111 is reinstalled at the reactor vessel 110.

The insertion keys 121 may be installed along the inner wall of the carrier 120 with constant intervals of 90° therebetween, and the keyways 116 may be installed along the outer wall of the lower reactor vessel assembly 111 with constant intervals of 90° therebetween. However, the present disclosure is not limited to the above examples, and, according to need, the insertion keys 121 and the keyways 116 may be formed at various positions.

Referring to FIG. 2, The rail 130 is installed at the bottom of the transfer canal 30 and extends from the reactor area 10 to the fuel handling area 20. A plurality of rails 130 may be installed, and the transfer cart 140, which will be described below, may be transferred via the rail 130.

The transfer cart 140 may be horizontally moved via the rail 130 and may be moved from the reactor area 10 to the fuel handling area 20 or from the fuel handling area 20 to the reactor area 10 via the rail 130.

The lifting device 150 is installed at the transfer cart 140. The lifting device 150 may be installed at an upper portion of the transfer cart 140, and may be horizontally moved along the rail 130 together with the transfer cart 140. That is, the lifting device 150 is moved along with the transfer cart 140.

The lifting device 150 is able to move upward or downward with respect to the transfer cart 140. In particular, the lifting device 150 may include a support portion 151 and a cross stand 152. The cross stand 152 moves upward or downward while folding or unfolding, and the support portion 151 may support the carrier 120.

The carrier 120, in which the lower reactor vessel assembly 111 detached from the reactor vessel 110 is accommodated, may be connected to the lifting device 150 to be moved upward or downward. In particular, the carrier 120 is connected to an upper portion of the support portion 151 by moving upward the cross stand 152 of the lifting device 150, and then the cross stand 152 is moved downward. Subsequently, when the transfer cart 140 is transferred along the rail 130, the lifting device 150 installed at the upper portion of the transfer cart 140, and the carrier 120 connected to the lifting device 150 may be horizontally moved together with the transfer cart 140.

Referring to FIG. 2, the drive device 160 may apply power to the transfer cart 140 and the lifting device 150. In particular, the drive device 160 may include a drive unit 161, a first extension stem 162, a second extension stem 163, a first gear shaft 164, and a second gear shaft 165.

The drive unit 161 is configured to provide power and may be installed at an upper portion of the fuel handling area 20. A water level is formed in the fuel handling area 20, and thus the drive unit 161 may be installed at an upper portion of the fuel handling area 20, where the water level is not reached.

The first extension stem 162, the second extension stem 163, the first gear shaft 164, and the second gear shaft 165 are configured to transmit power of the drive unit 161. In particular, the first extension stem 162 and the second extension stem 163 are connected to the drive unit 161, and extend downward of the drive unit 161. The first extension stem 162 and the second extension stem 163 may be connected to the drive unit 161 via a gear, and are rotatable by the drive unit 161.

Figure 4:
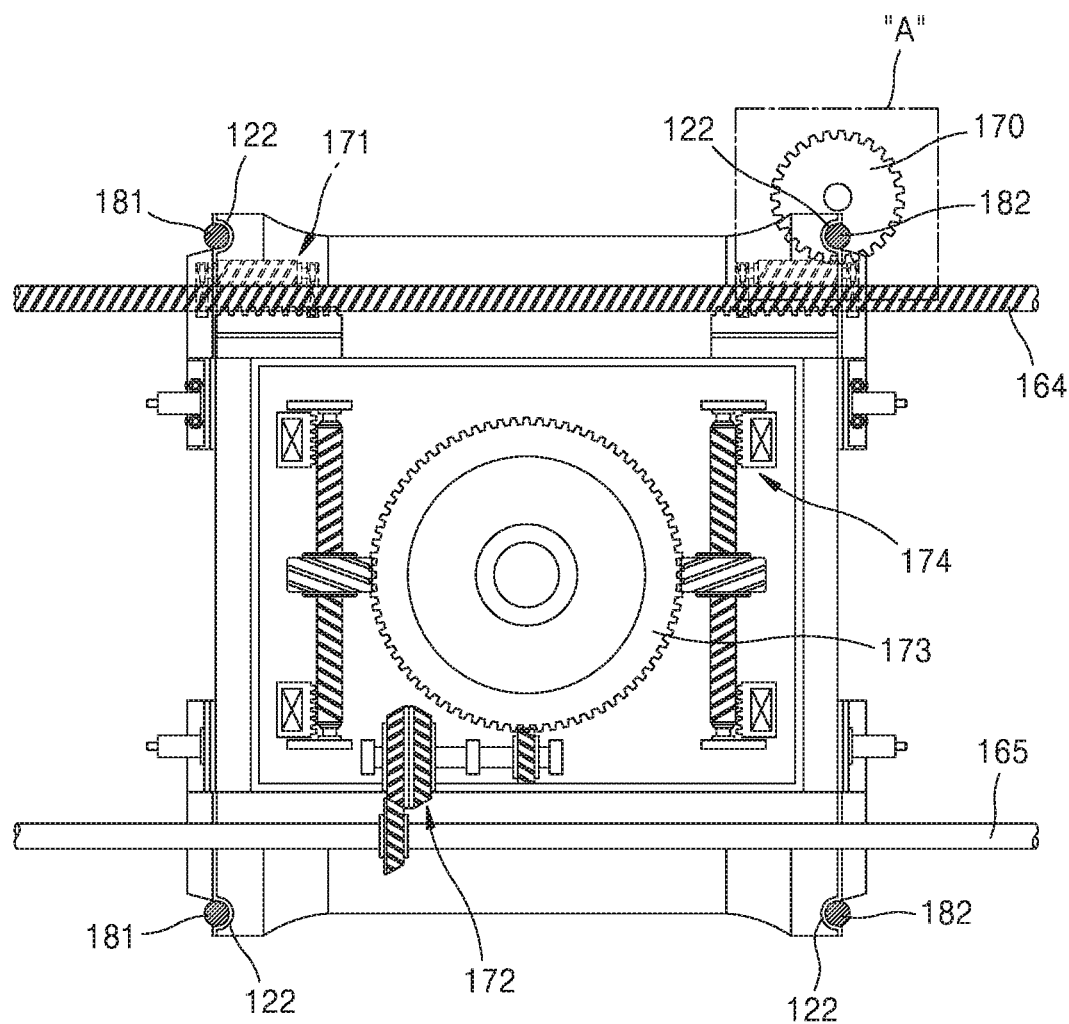
FIG. 4 is a lower view taken along line B-B of FIG. 2.

Power enabling the transfer cart 140 to be moved along the rail 130 may be transmitted from the drive unit 161 via the first extension stem 162 and the first gear shaft 164. Referring to FIGS. 2 and 4, the power of the drive unit 161 is transmitted to the first extension stem 162 to rotate the first extension stem 162. The rotated first extension stem 162 rotates the first gear shaft 164 horizontally extending from a lower portion of the first extension stem 162.

The first gear shaft 164 is connected to the transfer cart 140 via a gear to convert rotational movement of the first gear shaft 164 to horizontal movement of the transfer cart 140. In particular, the first gear shaft 164 is connected to the transfer cart 140 via rack and pinion gears 171 so that rotational movement of the first gear shaft 164 is converted into the horizontal movement of the transfer cart 140.

Power enabling the lifting device 150 to be moved upward or downward with respect to the transfer cart 140 may be transmitted from the drive unit 161 via the second extension stem 163 and the second gear shaft 165. Referring to FIGS. 2 and 4, the power of the drive unit 161 is transmitted to the second extension stem 163 to rotate the second extension stem 163. The rotated second extension stem 163 rotates the second gear shaft 165 horizontally extending from the lower portion of the second extension stem 163.

The second gear shaft 165 is connected to the lifting device 150 via a gear to convert rotational movement of the second gear shaft 165 into vertical movement of the lifting device 150. In particular, the second gear shaft 165 is connected to a first lifting gear 173 installed at the lifting device 150 via a plurality of intermediate gears 172. The first lifting gear 173 is a gear having a shaft in a direction parallel to a direction in which the lifting device 150 is moved upward or downward. The first lifting gear 173 is connected to a second lifting gear 174 consisting of rack and pinion gears, and the second lifting gear 174 is connected to the cross stand 152 so that the cross stand 152 is foldable. The second gear shaft 165 is connected to the cross stand 152 via gears to fold or unfold the cross stand 152 so that the lifting device 150 can be moved upward or downward.

The modular lower moving system for nuclear fuel handling may further include fixed guide pins 181 and rotary guide pins 182. The carrier 120 in which the lower reactor vessel assembly 111 is accommodated using the lifting device 150 should be moved upward or downward while maintaining a horizontal state without being shaken leftward or rightward, and, accordingly, the nuclear fuel 112 may be safely refueled.

The fixed guide pins 181 and the rotary guide pins 182 are configured to guide the lifting device 150 to be moved upward or downward while maintaining a horizontal state without being shaken leftward or rightward. The fixed guide pins 181 are installed at a side surface of the reactor area 10 and another side surface of the fuel handling area 20, and extend upward from a bottom surface 31.

In particular, referring to FIG. 2, the side surface of the reactor area 10 is a wall side of the reactor area 10, and the other side surface of the fuel handling area 20 is a wall side of the fuel handling area 20 (i.e., the side surface of the reactor area 10 is a side opposite to the transfer canal 30, and the other side surface of the fuel handling area 20 is a side opposite to the transfer canal 30). The fixed guide pins 181 have a rod shape and extend upward from the bottom surface 31 to a portion in which the lower reactor vessel assembly 111 is coupled to the reactor vessel 110.

The rotary guide pins 182 extend upward from the bottom surface 31 and are installed separate from the fixed guide pins 181 with a constant interval therebetween. The rotary guide pins 182 are respectively installed at the reactor area 10 and the fuel handling area 20 and consist of the rotary guide pin 182 spaced apart from the side surface of the reactor area 10 with a constant interval therebetween and the rotary guide pin 182 spaced apart from the other side surface of the fuel handling area 20 with a constant interval therebetween. In this regard, a direction separate from the fixed guide pins 181 at a constant interval is a direction separate towards the transfer canal 30 (i.e., when the fixed guide pin 181 is positioned at the reactor area 10, the rotary guide pin 182 is positioned separate from the reactor area 10 in a direction towards the transfer canal 30 and, when the fixed guide pin 181 is positioned at the fuel handling area 20, the rotary guide pin 182 is positioned separate from the fuel handling area 20 in a direction towards the transfer canal 30).

Groove-shaped hole plugs 122 enabling the fixed guide pins 181 or the rotary guide pins 182 to be inserted thereinto may be provided at least one of the carrier 120, the transfer cart 140, and the lifting device 150. The fixed guide pins 181 or the rotary guide pins 182 are inserted into the hole plugs 122 so that horizontal movements of the carrier 120, the transfer cart 140, and the lifting device 150 can be restricted thereby, and, accordingly, the lifting device 150 may be moved upward while maintaining a horizontal state without being shaken leftward or rightward.

In particular, referring to FIG. 4, two fixed guide pins 181 and two rotary guide pins 182 may be installed. In the case of the reactor area 10, the two fixed guide pins 181 may be installed at the side surface of the reactor area 10 (i.e., the wall side of the reactor area 10), and the two rotary guide pins 182 spaced apart from the fixed guide pins 181 with a constant interval therebetween may be installed. In the case of the fuel handling area 20, the two fixed guide pins 181 may be installed at the other side surface of the fuel handling area 10 (i.e., the wall side of the fuel handling area 20), and the two rotary guide pins 182 spaced apart from the fixed guide pins 181 with a constant interval therebetween may be installed.

As described above, since the carrier 120, the transfer cart 140, and the lifting device 150 are integrally moved horizontally, the hole plugs 122 may be installed at least one of the carrier 120, the transfer cart 140, and the lifting device 150. However, to effectively prevent the carrier 120 from being shaken, the hole plugs 122 may be installed only at the carrier 120 and the transfer cart 140.

Since the fixed guide pins 181 and the rotary guide pins 182 restrict the horizontal movements of the carrier 120, the transfer cart 140, and the lifting device 150, there are concerns that the movement of the transfer cart 140 is restricted by the rotary guide pins 182. Thus, the rotary guide pins 182 are rotatable about a first virtual axis 183 extending in a direction parallel to a direction in which the rotary guide pins 182 extend upward.

Figure 5:
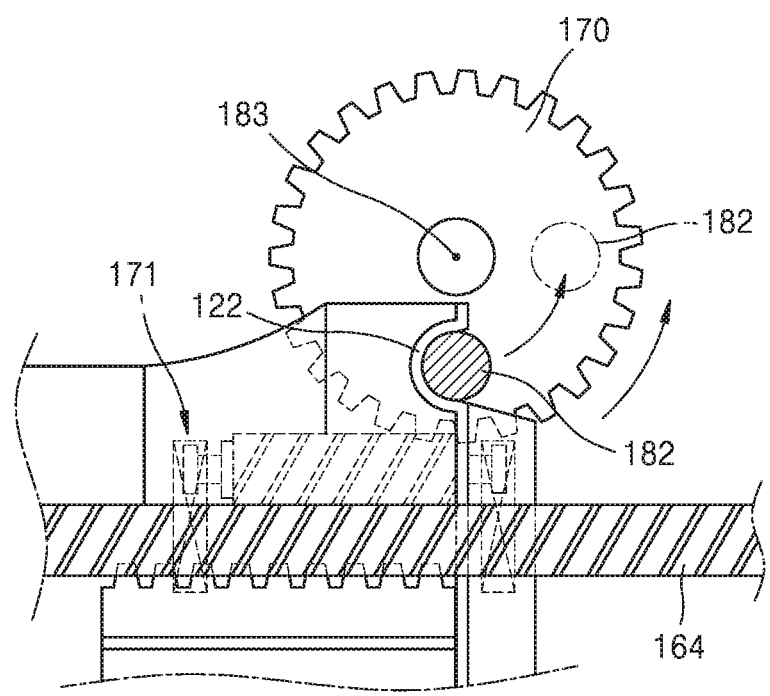
FIG. 5 is a partially enlarged view of portion A of FIG. 4.

In particular, referring to FIG. 5, the rotary guide pins 182 are inserted into the hole plugs 122 when the carrier 120 is moved upward or downward by the lifting device 150, thereby restricting the horizontal movements of the carrier 120, the transfer cart 140, and the lifting device 150. However, when the transfer cart 140 has to horizontally move along the rail 130, the rotary guide pins 182 escape from the hole plugs 122 while being rotated about the first virtual axis 183.

In this regard, the rotary guide pins 182 are rotated to be positioned at a portion outside a horizontal movement path of the transfer cart 140. When the rotary guide pins 182 are positioned at the portion outside the horizontal movement path of the transfer cart 140 by escaping from the hole plugs 122, the rotary guide pins 182 do not restrict the horizontal movements of the carrier 120, the transfer cart 140, and the lifting device 150 any longer so that the transfer cart 140 can be horizontally moved.

A driving force for rotating the rotary guide pins 182 may be provided by a separate driving force device, but may be provided by the above-described drive device 160. In particular, the driving force may be transmitted by the first extension stem 162 and the first gear shaft 164 connected to the first extension stem 162.

Referring to FIG. 5, a rotary gear 170 may be installed at a side surface of the first gear shaft 164, and the rotary guide pin 182 is eccentrically installed at the rotary gear 170. The rotary gear 170 is connected to the first gear shaft 164 and may be rotated by the first gear shaft 164. The center of the rotary gear 170 may be positioned on the first virtual axis 183.

When the rotary gear 170 is rotated, the rotary guide pin 182 eccentrically installed at the rotary gear 170 is rotated with a radius eccentric from the center of the rotary gear 170. As the rotary guide pin 182 is rotated with the eccentric radius, the rotary guide pin 182 is positioned outside the horizontal movement path of the transfer cart 140 while escaping from the hole plug 122.

A method of refueling nuclear fuel using the above-described modular lower moving system for nuclear fuel handling will be described as follows. The modular lower moving system for nuclear fuel handling used in the method of refueling nuclear fuel is the same as that described above, and thus a detailed description thereof will be omitted.

The method of refueling nuclear fuel using the above-described modular lower moving system for nuclear fuel handling is a process of transferring the nuclear fuel 112 from the reactor area 10 to the fuel handling area 20, but the present disclosure is not limited thereto, and may also include a process of transferring the nuclear fuel 112 from the fuel handling area 20 to the reactor area 10 (in particular, a nuclear fuel loading process (operation S700).

Figure 6:
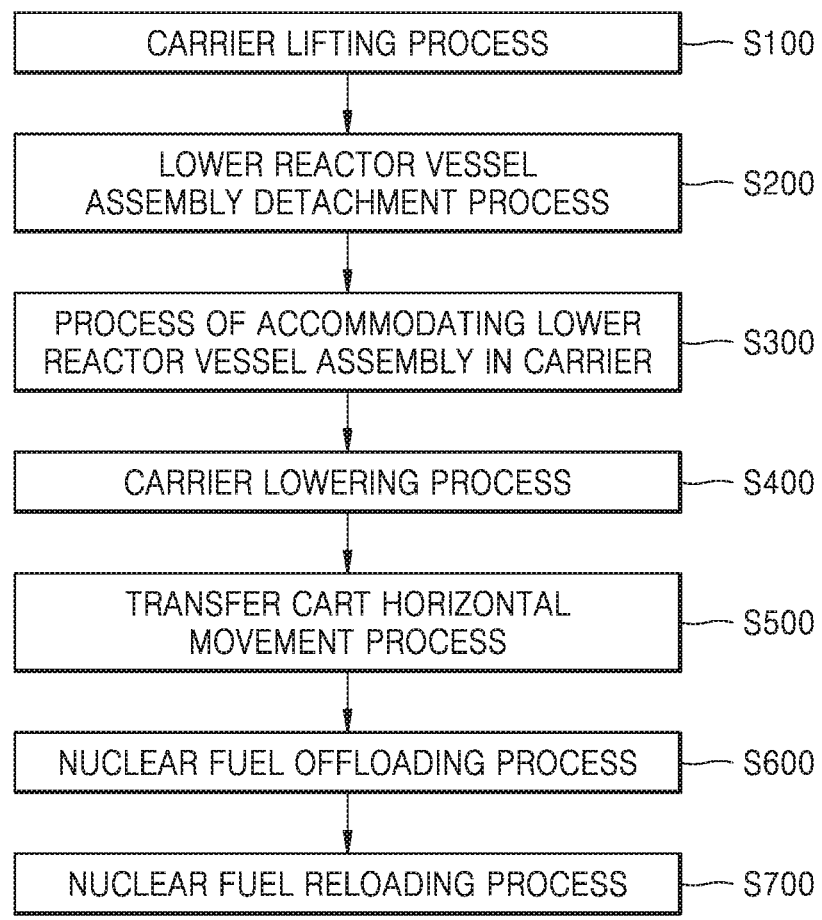
FIG. 6 is a flowchart illustrating a method of refueling nuclear fuel using the modular lower moving system for nuclear fuel handling according to an embodiment.

Referring to FIG. 6, the method of refueling nuclear fuel using the above-described modular lower moving system for nuclear fuel handling includes a carrier lifting process (operation S100), a lower reactor vessel assembly detachment process (operation S200), a process of accommodating a lower reactor vessel assembly in a carrier (operation S300), a carrier lowering process (operation S400), a transfer cart horizontal movement process (operation S500), and a nuclear fuel offloading process (operation S600).

The carrier lifting process (operation S100) is a process of lifting the carrier 120 from the reactor area 10 via the lifting device 150. Referring to FIG. 2, the lifting device 150 is moved upward to a position allowing the carrier 120 connected to the lifting device 150 to support the lower reactor vessel assembly 111. That is, the carrier 120 is moved upward so that the lower reactor vessel assembly 111 is accommodated in the carrier 120 to closely contact the carrier 120.

Referring to FIG. 3, when the lower reactor vessel assembly 111 is accommodated in the carrier 120, to facilitate alignment of the lower reactor vessel assembly 111, the keyways 116 may be installed at the outer wall of the lower reactor vessel assembly 111 and the insertion keys 121 may be installed at the inner wall of the carrier 120.

In particular, the keyways 116 protrude from the outer wall of the lower reactor vessel assembly 111 and have the grooves 117 allowing the insertion keys 121 to be inserted thereinto. The insertion keys 121 protrude from the inner wall of the carrier 120 into the carrier 120 and may be inserted into the respective grooves 117.

As the insertion keys 121 are inserted into the grooves 117 of the keyways 116, the lower reactor vessel assembly 111 may be accommodated in the carrier 120 without being shaken, and the lower reactor vessel assembly 111 is accommodated in the carrier 120 in a designated direction.

The insertion keys 121 may be installed along the inner wall of the carrier 120 with constant intervals of 90° therebetween, and the keyways 116 may be installed along the outer wall of the lower reactor vessel assembly 111 with constant intervals of 90° therebetween. However, the present disclosure is not limited to the above examples, and, according to need, the insertion keys 121 and the keyways 116 may be formed at various positions.

The lifting device 150 may be lifted via the fixed guide pins 181 and the rotary guide pins 182. The fixed guide pins 181 and the rotary guide pins 182 are configured to guide the lifting device 150 to be lifted so that the lifting device 150 is horizontally restricted via the fixed guide pins 181 and the rotary guide pins 182, and thus is lifted without being shaken leftward or rightward.

The rotary guide pins 182 are rotatable about the first virtual axis 183, and are rotated when the lifting device 150 is lifted, to be inserted into the hole plugs 122. In particular, the rotary guide pin 182 is eccentrically installed at the rotary gear 170 installed at the side surface of the first gear shaft 164 (the rotary gear 170 may receive power from the first gear shaft 164).

When the rotary gear 170 is rotated, the rotary guide pin 182 eccentrically installed at the rotary gear 170 may be rotated with a radius eccentric from the center of the rotary gear 170. In the carrier lifting process (operation S100), the rotary guide pins 182 are rotated to be inserted into the hole plugs 122 so that the carrier 120 can be horizontally restricted thereby.

The lower reactor vessel assembly detachment process (operation S200) is a process of detaching the lower reactor vessel assembly 111 installed below the reactor vessel 110. The lower reactor vessel assembly 111 is supported by the carrier 120 being lifted by the lifting device 150. Thus, the lower reactor vessel assembly 111 may be detached without being dropped, by the carrier 120.

The reactor vessel 110 is separated from the lower reactor vessel assembly 111 by separating the bolts 114 passing through the upper and lower flanges 113a and 113b from the nuts 115 fastened with the bolts 114. At this time, separation between the bolts 114 and the nuts 115 may be remotely performed due to a radiation environment of the reactor area 10.

The process of accommodating a lower reactor vessel assembly in a carrier (operation S300) is a process of accommodating the lower reactor vessel assembly 111 detached from the reactor vessel 110 in the carrier 120. Since the carrier 120 is lifted to a position capable of supporting the lower reactor vessel assembly 111, when the bolts 114 are separated from the nuts 115, the lower reactor vessel assembly 111 is accommodated in the carrier 120.

The carrier lowering process (operation S400) is a process of lowering the carrier 120 via the lifting device 150. The carrier 120 is moved downward while the lifting device 150 is lowered, and, accordingly, the lower reactor vessel assembly 111 accommodated in the carrier 120 is moved downward therewith.

The transfer cart horizontal movement process (operation S500) is a process of horizontally moving the transfer cart 140 from the reactor area 10 to the fuel handling area 20, and the transfer cart 140 is transferred to the fuel handling area 20 from the reactor area 10 via the transfer canal 30. The transfer cart 140 is moved along the rail 130, and, before the transfer cart 140 is moved along the rail 130, the rotary guide pins 182 escape from the hole plugs 122 by rotation.

When the rotary guide pins 182 are positioned at the hole plugs 122, the transfer cart 140 is horizontally restricted and thus cannot perform horizontal movement. Accordingly, the rotary guide pins 182 escape from the hole plugs 122 by rotation, and the rotary guide pins 182 are rotated until the rotary guide pins 182 deviate from the horizontal movement path of the transfer cart 140.

The transfer cart 140 is transferred to the fuel handling area 20 to positions of the fixed guide pins 181 installed at the other side surface of the fuel handling area 20. That is, the transfer cart 140 is transferred until the fixed guide pins 181 are inserted into the hole plugs 122 installed at least one of the carrier 120, the lifting device 150, and the transfer cart 140 (At this time, the rotary guide pins 182 installed at the fuel handling area 20 are also in a rotated state, and thus are outside the horizontal movement path of the transfer cart 140).

The nuclear fuel offloading process (operation S600) is a process of offloading the nuclear fuel 112 installed in the lower reactor vessel assembly 111 by lifting the carrier 120 via the lifting device 150. In particular, the nuclear fuel offloading process (operation S600) includes connecting the nuclear fuel 112 to a spent fuel handling machine 190 by lifting the lifting device 150 of the transfer cart 140 transferred to the fuel handling area 20 and transporting the nuclear fuel 112 to a spent fuel storage tank 40 via the spent fuel handling machine 190.

When the transfer cart 140 is transferred to the fuel handling area 20, the rotary guide pins 182 are inserted into the hole plugs 122 by rotation so that horizontal movement of the transfer cart 140 is restricted.

When the horizontal movement of the transfer cart 140 is restricted, the lifting device 150 is moved upward by being guided by the fixed guide pins 181 and the rotary guide pins 182 and the carrier 120 is lifted at the same time. At this time, a lifted position of the carrier 120 is a height allowing the nuclear fuel 112 of the lower reactor vessel assembly 111 to be fastened with the spent fuel handling machine 190 installed at the fuel handling area 20.

Referring to FIG. 2, the nuclear fuel 112 is fastened to a handling tool 192 of the spent fuel handling machine 190 and then transferred to the spent fuel storage tank 40. In particular, the nuclear fuel 112 is transferred, via the spent fuel handling machine 190, to the spent fuel storage tank 40 that is connected to the fuel handling area 20 via a water gate 41 and includes a spent fuel storage rack 42 installed therein.

The method of refueling nuclear fuel using the modular lower moving system for nuclear fuel handling may further include a nuclear fuel loading process (operation S700). The nuclear fuel loading process (operation S700) may proceed in an opposite order to the carrier lifting process (operation S100), the lower reactor vessel assembly detachment process (operation S200), the process of accommodating a lower reactor vessel assembly in a carrier (operation S300), the carrier lowering process (operation S400), the transfer cart horizontal movement process (operation S500), and the nuclear fuel offloading process (operation S600).

In particular, the nuclear fuel 112 is offloaded from the lower reactor vessel assembly 111 via the spent fuel handling machine 190, and then new nuclear fuel 112 is loaded in the lower reactor vessel assembly 111 via the spent fuel handling machine 190. Subsequently, the carrier 120 is lowered via the lifting device 150, and the transfer cart 140 is horizontally transferred from the fuel handling area 20 to the reactor area 10. Thereafter, the carrier 120 is lifted via the lifting device 150, and the lower reactor vessel assembly 111 is coupled to a lower portion of the reactor vessel 110, thereby completing refueling of the nuclear fuel 112.

In the method of refueling nuclear fuel using the modular lower moving system for nuclear fuel handling, power for driving the transfer cart 140 and the lifting device 150 is provided via the drive device 160. In particular, the drive device 160 may include the drive unit 161, the first extension stem 162, the second extension stem 163, the first gear shaft 164, and the second gear shaft 165.

The drive unit 161 is configured to provide power, and may be installed at an upper portion of the fuel handling area 20. Since a water level is formed in the fuel handling area 20, the drive unit 161 may be installed at an upper portion of the fuel handling area 20, where the water level is not formed.

The first extension stem 162, the second extension stem 163, the first gear shaft 164, and the second gear shaft 165 are configured to transmit power of the drive unit 161. In particular, the first extension stem 162 and the second extension stem 163 are connected to the drive unit 161, and extend downward of the drive unit 161. The first extension stem 162 and the second extension stem 163 may be connected to the drive unit 161 via a gear, and are rotatable by the drive unit 161.

Power enabling the transfer cart 140 to be moved along the rail 130 may be transmitted from the drive unit 161 via the first extension stem 162 and the first gear shaft 164. Referring to FIGS. 2 and 4, the power of the drive unit 161 is transmitted to the first extension stem 162 to rotate the first extension stem 162. The rotated first extension stem 162 rotates the first gear shaft 164 horizontally extending from a lower portion of the first extension stem 162.

The first gear shaft 164 is connected to the transfer cart 140 via a gear to convert rotational movement of the first gear shaft 164 to horizontal movement of the transfer cart 140. In particular, the first gear shaft 164 is connected to the transfer cart 140 via rack and pinion gears 171 so that the rotational movement of the first gear shaft 164 is converted into the horizontal movement of the transfer cart 140.

Power enabling the lifting device 150 to be moved upward or downward with respect to the transfer cart 140 may be transmitted from the drive unit 161 via the second extension stem 163 and the second gear shaft 165. Referring to FIGS. 2 and 4, the power of the drive unit 161 is transmitted to the second extension stem 163 to rotate the second extension stem 163. The rotated second extension stem 163 rotates the second gear shaft 165 horizontally extending from the lower portion of the second extension stem 163.

The second gear shaft 165 is connected to the lifting device 150 via a gear to convert rotational movement of the second gear shaft 165 into vertical movement of the lifting device 150. In particular, the second gear shaft 165 is connected to the first lifting gear 173 installed at the lifting device 150 via the intermediate gears 172. The first lifting gear 173 is a gear having a shaft in a direction parallel to a direction in which the lifting device 150 is moved upward or downward. The first lifting gear 173 is connected to the second lifting gear 174 consisting of rack and pinion gears, and the second lifting gear 174 is connected to the cross stand 152 so that the cross stand 152 is foldable. The second gear shaft 165 is connected to the cross stand 152 via gears to fold or unfold the cross stand 152 so that the lifting device 150 can be moved upward or downward.

A driving force for rotating the rotary guide pins 182 may be provided by a separate driving force device, but may be provided by the above-described drive device 160. In particular, the driving force may be transmitted by the first extension stem 162 and the first gear shaft 164 connected to the first extension stem 162.

Referring to FIG. 5, the rotary gear 170 may be installed at a side surface of the first gear shaft 164, and the rotary guide pin 182 is eccentrically installed at the rotary gear 170. The rotary gear 170 is connected to the first gear shaft 164 and may be rotated by the first gear shaft 164. The center of the rotary gear 170 may be positioned on the first virtual axis 183.

FIG. 7 illustrates another embodiment of a method of refueling nuclear fuel using the modular lower moving system for nuclear fuel handling. The embodiment of FIG. 7 is the same as the above-described embodiment in that the lower reactor vessel assembly 111 is transferred to the fuel handling area 20 from the reactor area 10 via the transfer cart 140 and differs therefrom in that a crane 191 may be used when offloading the nuclear fuel 112 from the fuel handling area 20.

To use the crane 191, the fuel handling area 20 consists of a building having a height difference. In particular, the fuel handling area 20 includes a first zone 21 at a lower height and a second zone 22 located at a height higher than the first zone 21 and including a temporary storage stand 23 allowing the carrier 120 to be mounted thereon.

Referring to FIG. 7, the carrier 120 transferred to the first zone 21 of the fuel handling area 20 is connected to the crane 191 to be transported to the temporary storage stand 23 of the second zone 22. The carrier 120 transported to the storage temporary stand 23 is transferred to the spent fuel storage tank 40 via the spent fuel handling machine 190 using the same method as that described above.

As such, when the process of transferring the carrier 120 to the second zone 22 from the first zone 21 using the crane 191 is used, the carrier 120 does not need to be lifted. In addition, since the carrier 120 does not need to be lifted, the transferring process is enabled without a limitation in lifting height of the lifting device 150, and the crane 191 may be used even if a malfunction occurs in the lifting device 150.

The above-described modular lower moving system for nuclear fuel handling and the method of refueling nuclear fuel using the same have the following effects.

In the preset disclosure, the lower reactor vessel assembly 111, in which the nuclear fuel 112 is loaded, is detached from the lower portion of the reactor vessel 110, and the nuclear fuel 112 is transferred from the lower portion of the reactor vessel 110 using the lifting device 150 and the transfer cart 140, and, accordingly, a nuclear fuel refueling operation may be independently performed without being affected by removal of upper subsidiary equipment. In addition, when needed, an upper related subsidiary equipment removal process and a fuel handling process may be performed in parallel, thus effectively reducing working time.

In addition, separate equipment for removing the upper subsidiary equipment is not needed, and thus equipment may be simplified, thus achieving economic effects and safety of nuclear fuel handling.

In terms of application of a modularization method, it is considerably important to safely handle the lower reactor vessel assembly 111, which is a heavy lift, at a low speed. In the present disclosure, to address problems in terms of hydraulic maintenance and repair, power is transmitted using gears, and the lower reactor vessel assembly 111 is transferred using gears, thus enhancing equipment reliability.

In addition, the keyways 116 are installed at the outer wall of the lower reactor vessel assembly 111 with constant intervals of 90° therebetween, and the insertion keys 121 are installed at the inner wall of the carrier 120, and thus, when the lower reactor vessel assembly 111 is installed again in the water, alignment thereof may be easy and workability thereof in a narrow space may be enhanced.

In addition, horizontal movements of the carrier 120, the transfer cart 140, and the lifting device 150 may be restricted in the reactor area 10 or the fuel handling area 20 via the fixed guide pins 181 and the rotary guide pins 182, thereby lifting or lowering the carrier 120 without being shaken.

In existing pressurized water reactor-type nuclear power plants, to reload nuclear fuel, a reactor head area structure assembly, a reactor vessel closure head, and an upper guide structure should be all removed, and thus complicated procedures and operations for removing related components are required. In addition, recently, a variety of recent technologies, such as top-mounted in-core instrumentation (TM-ICI), and the like, have been applied to an upper portion of a reactor, and a large number of equipment has been located at an upper portion of nuclear fuel in a reactor such as a small modular reactor (SMR), thus increasing design complexity, and, accordingly, a large amount of handling time is required to reload nuclear fuel and there are risks for safety-related accidents. Therefore, there is a need to develop a novel method of handling nuclear fuel.

The present disclosure provides a nuclear fuel handling method different from existing methods, in which a modular type detachable from an upper end of nuclear fuel loaded below a reactor, i.e., a lower end portion of a reactor vessel, is applied, and a lower reactor vessel assembly including the nuclear fuel loaded below the reactor is transferred by a modular lower moving system, and, accordingly, intrinsic functions of devices are maintained and design characteristics to enhance fabrication and economic efficiency are achieved.

In particular, since the modular type detachable from the lower end portion of the reactor vessel (the upper end of the nuclear fuel) is applied, a nuclear fuel refueling operation may be independently performed without being affected by removal of upper reactor subsidiary equipment, and, when needed, an upper related subsidiary equipment removal process and a fuel handling process may be performed in parallel, thus effectively reducing working time.

In addition, in the present disclosure, gears that significantly enhance safety of nuclear fuel may be used as power in the underwater, thus accurately transmitting power, since existing wire rope-type or hydraulic power units suitable for lightweight and short-distance fuel transfer cannot guarantee the safety of nuclear fuel in transporting a heavy lift of a carrier and transfer thereof between areas. In particular, in a modular lower moving system for nuclear fuel handling which uses gears, a plurality of safety devices (e.g., keyways, insertion keys, fixed guide pins, rotary guide pins, and the like) are mechanically operated and nuclear fuel should be handled below a reactor, thus reducing radiation exposure and reducing the possibility of potential accident risks, and dual operation at upper and lower sides is easy, which results in increased utilization efficiency, and thus the nuclear fuel handling method is facilitated.

As is apparent from the foregoing description, a lower reactor vessel assembly, in which nuclear fuel is loaded, is detached from a lower portion of a reactor vessel, and the nuclear fuel is transferred from the lower portion of the reactor vessel using a lifting device and a transfer cart, and, accordingly, a nuclear fuel refueling operation may be independently carried out without being affected by removal of upper subsidiary equipment.

In addition, separate equipment for removing the upper subsidiary equipment is not needed, and thus equipment may be simplified, thus achieving economic effects and safety of nuclear fuel handling.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the disclosure as defined by the following claims.

What is claimed is:

1. A modular lower moving system for nuclear fuel handling, the modular lower moving system comprising:
   a lower reactor vessel assembly installed below a reactor vessel located in a reactor area, detachable from the reactor vessel, and comprising nuclear fuel loaded therein;
   a carrier having a space allowing the lower reactor vessel assembly detached from the reactor vessel to be accommodated therein;
   a rail installed at a bottom of a transfer canal and extended from the reactor area to a fuel handling area;
   a transfer cart horizontally movable along the rail;
   a lifting device installed on the transfer cart, horizontally movable along the rail along with the transfer cart, and movable upward or downward with respect to the transfer cart; and
   a drive device configured to supply power to the transfer cart and the lifting device,
   wherein the carrier is assembled on the lifting device to be lifted or lowered via the lifting device, the lower reactor vessel assembly detached from the reactor vessel is accommodated in the carrier, and the carrier is horizontally movable along the rail via the transfer cart,
   wherein the drive device comprises:
      a drive unit installed in the fuel handling area and configured to provide power;
      a first extension stem connected to the drive unit and extending downward of the drive unit;
      a first gear shaft connected to the first extension stem and connected to the transfer cart;
      a second extension stem connected to the drive unit and extending downward of the drive unit; and
      a second gear shaft connected to the second extension stem and connected to the lifting device,
      wherein power of the drive unit is transmitted to the transfer cart via the first extension stem and the first gear shaft, and is transmitted to the lifting device via the second extension stem and the second gear shaft.

2. The modular lower moving system of claim 1, wherein the first gear shaft is connected to the transfer cart via a first gear configured to convert rotational movement of the first gear shaft into horizontal movement of the transfer cart, and the second gear shaft is connected to the lifting device via a second gear configured to convert rotational movement of the second gear shaft into vertical movement of the lifting device.

3. The modular lower moving system of claim 1, wherein the carrier is provided, at an inner wall thereof, with insertion keys protruding inward of the carrier, and
   the lower reactor vessel assembly is provided, at an outer wall thereof, with keyways protruding outside the lower reactor vessel assembly and each having a groove allowing the insertion key to be inserted thereinto.

4. The modular lower moving system of claim 3, wherein the insertion keys are installed along the inner wall of the carrier with constant intervals of 90° therebetween, and the keyways are installed along the outer wall of the lower reactor vessel assembly with constant intervals of 90° therebetween.

5. The modular lower moving system of claim 1, wherein a fixed guide pin is installed at a side surface of the reactor area and another fixed guide pin is installed at a side surface of the fuel handling area, the fixed guide pins having a rod shape and extending upward from a surface on which the rail is installed, and
   a rotary guide pin is arranged, the rotary guide pin extending upward from the surface, spaced apart from the fixed guide pin by a constant distance, and having a rod shape,
   wherein the rotary guide pin is rotatable about a first virtual axis extending in a direction parallel to a direction in which the rotary guide pin extends upward.

6. The modular lower moving system of claim 5, wherein the drive device comprises:
   a rotary gear connected to a side surface of the first gear shaft,
   wherein a center of the rotary gear is positioned on the first virtual axis, and the rotary guide pin is eccentrically installed at the rotary gear, allowing the rotary guide pin to be rotatable via the rotary gear.

7. The modular lower moving system of claim 6, further comprising:
   a hole plug installed on at least one of the carrier, the lifting device, and the transfer cart, and having a groove shape allowing the fixed guide pin or the rotary guide pin to be inserted thereinto.

* * * * *